(12) United States Patent
Halliday

(10) Patent No.: US 7,543,402 B2
(45) Date of Patent: Jun. 9, 2009

(54) COMPOSITE LABEL AND METHOD OF LABELING

(75) Inventor: Brian L. Halliday, Hickory, NC (US)

(73) Assignee: Paxar Americas, Inc., Miamisburg, OH (US)

( * ) Notice: Subject to any disclaimer, the term of this patent is extended or adjusted under 35 U.S.C. 154(b) by 75 days.

(21) Appl. No.: 11/789,618

(22) Filed: Apr. 25, 2007

(65) Prior Publication Data

US 2008/0263919 A1    Oct. 30, 2008

(51) Int. Cl.
*G09F 3/10* (2006.01)

(52) U.S. Cl. .................................. 40/638; 40/661.04

(58) Field of Classification Search .......... 40/661.04, 40/675, 299.01, 329, 636, 640, 638, 661.09, 40/674; 2/275, 243.1
See application file for complete search history.

(56) References Cited

U.S. PATENT DOCUMENTS

| | | | | |
|---|---|---|---|---|
| 1,835,084 A | * | 12/1931 | Ripin | ........................... 40/674 |
| 3,755,934 A | * | 9/1973 | Porcher et al. | ................ 40/674 |
| 4,776,043 A | * | 10/1988 | Coleman | .................... 2/209.12 |
| 4,981,742 A | * | 1/1991 | Haigh | ........................ 428/66.5 |
| 5,583,489 A | | 12/1996 | Loemker et al. | |
| 6,091,333 A | * | 7/2000 | Oshima | .................... 340/572.1 |
| 6,684,543 B2 | * | 2/2004 | Fernau | ........................ 40/636 |
| 6,796,065 B2 | * | 9/2004 | Haas | ....................... 40/661.04 |
| 7,308,771 B2 | * | 12/2007 | Memelink | .................... 40/649 |

OTHER PUBLICATIONS

1percent.com, http://web.archive.org/web/20050329122859/http://www.1percent.com/store/cart/FHCAPPET-BLK.html, Mar. 29, 2005.*

* cited by examiner

*Primary Examiner*—Gary C Hoge
(74) *Attorney, Agent, or Firm*—Joseph J. Grass

(57) ABSTRACT

There are disclosed a composite label for use in garments and other substrates and method of labeling. The composite label includes at least one label and a connector. The connector may be attached to a garment and subsequently the label(s) may be detached from the connector without cutting the label from the garment. The method includes attaching the composite label to a garment, and subsequently replacing one or more labels with another label or labels.

6 Claims, 3 Drawing Sheets

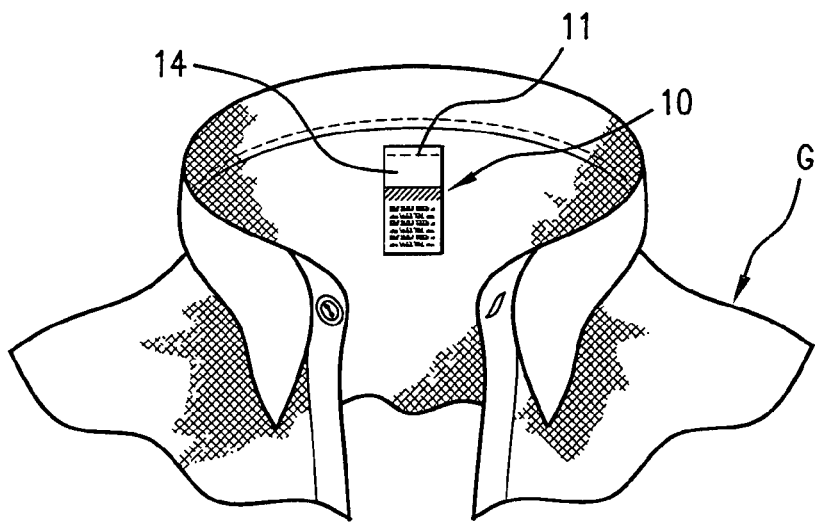
FIG. 1
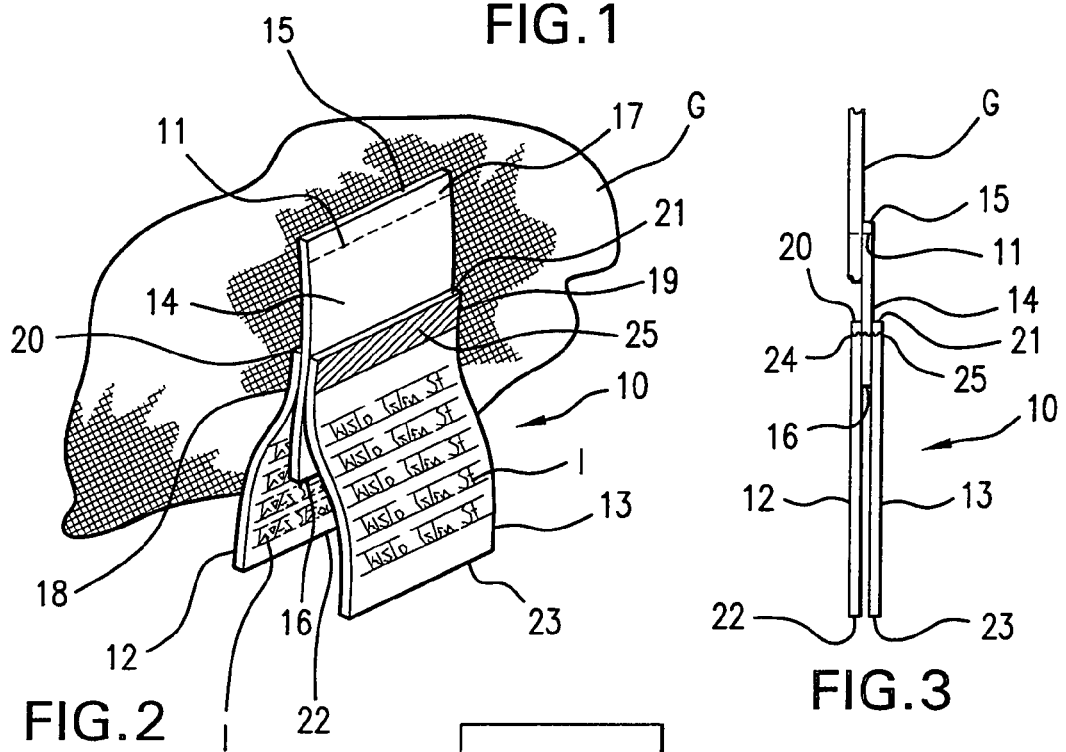
FIG. 2
FIG. 3
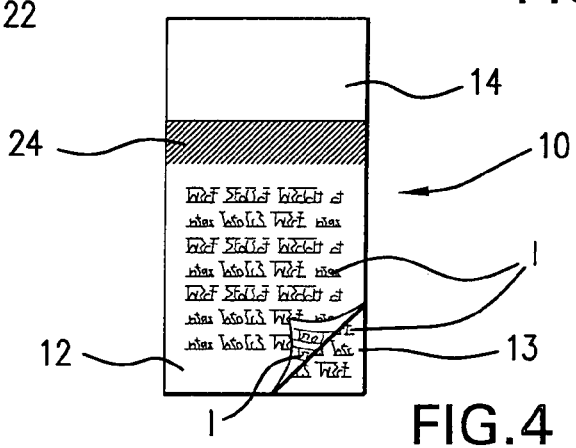
FIG. 4

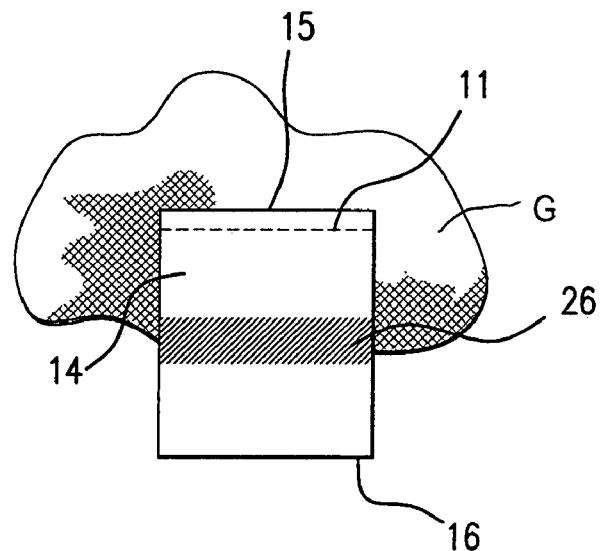
FIG.5
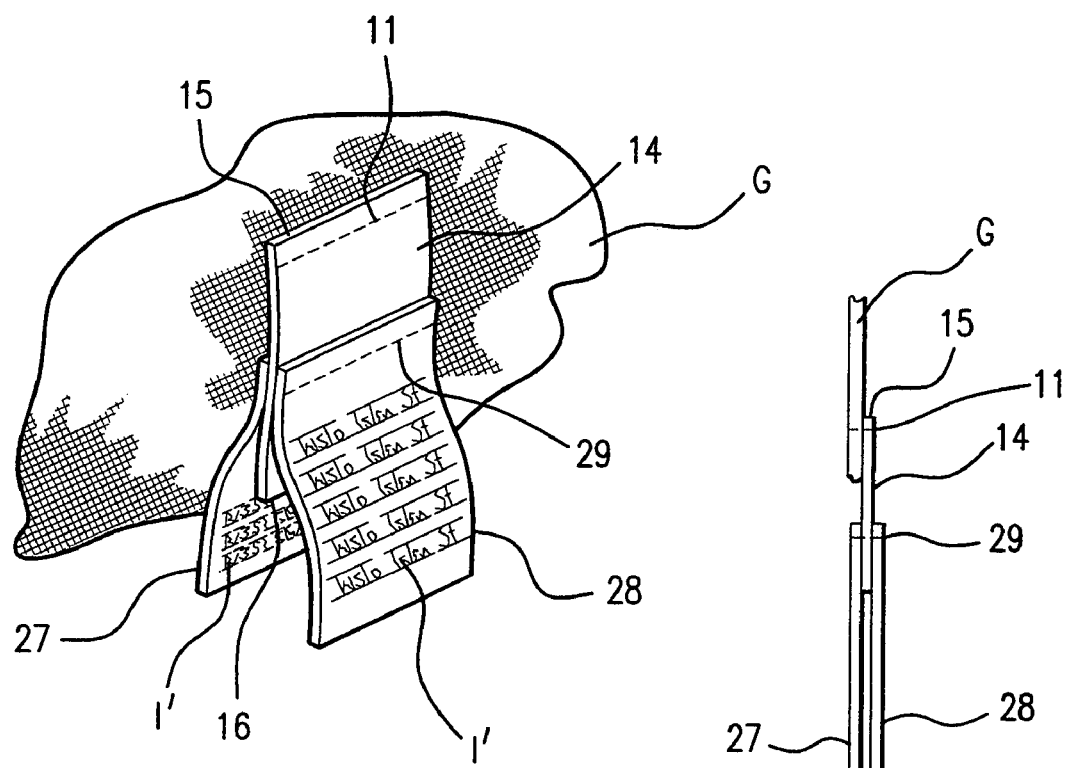
FIG.6
FIG.7

COMPOSITE LABEL AND METHOD OF LABELING

BACKGROUND

1. Field

The embodiments relate to the field of labeling.

2. Brief Description of the Prior Art

A prior art disclosure is shown in FIGS. 8 and 9 and is described in the specification.

U.S. Pat. No. 5,583,489 is made of record.

SUMMARY

An embodiment includes a composite label that can be attached to a garment, wherein the composite label includes at least one fabric label containing information, and a connector preferably composed of fabric, wherein the label is removably connected to the connector without cutting the label, and the connector is capable of being secured to a garment. It is preferred that the connector comprise a panel having opposite sides, wherein there are at least two fabric labels, wherein one of the labels is removably connected to one side of the panel, and wherein the other label is removably connected to the other side of the panel. It is preferred that the labels are connected or attached to the connector by a connection which is weak enough so that the labels can be manually pulled or stripped from the panel, but which is strong enough to endure repeated washings or dry cleanings. The connection can be by an adhesive or by a heat seal such as an ultrasonic seal or connection. It is preferred that the labels and the connector be composed of a fabric material which is essentially unreceptive to colored dyes.

An embodiment of a method of labeling includes providing at least one fabric label removably connected to a fabric connector without cutting, connecting the connector to a garment, removing at least one of the labels, and adhering a different label or labels to the connector. The garment may be dyed after the connector is connected to the garment but before the different label(s) is (are) adhered to the connector.

BRIEF DESCRIPTION OF THE DIAGRAMMATIC DRAWINGS

FIG. 1 is a fragmentary pictorial view of a garment showing a composite garment label according to an embodiment;

FIG. 2 is a pictorial view of a composite label attached to a garment;

FIG. 3 is a side elevational view as seen from the left side of FIG. 2;

FIG. 4 is a rear elevational view as seen from the left side of FIG. 3;

FIG. 5 is an elevational view of a connector of the composite garment label, wherein the connector is attached to the garment, and from where the labels have been removed;

FIG. 6 is a pictorial view showing labels that differ from the labels shown in FIG. 1 through 4, attached to the connector;

FIG. 7 is a side elevational view of the composite label and a fragment of the garment shown in FIG. 6;

DETAILED DESCRIPTION OF THE PREFERRED EMBODIMENTS

Figure 8:
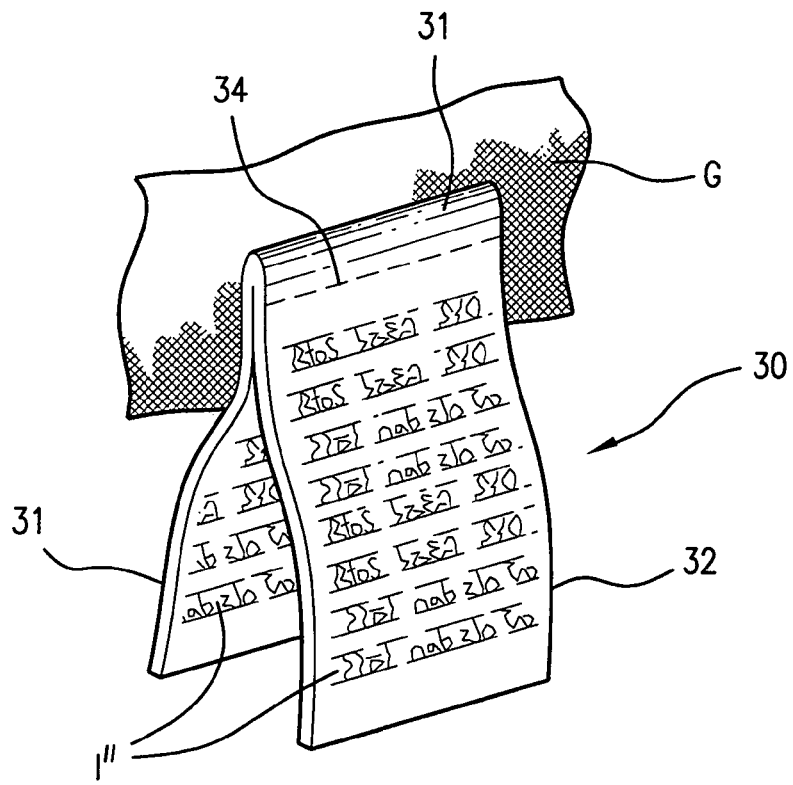
FIG. 8 is a pictorial view of a prior art composite label on a garment.

With reference initially to FIG. 1, there is shown a fabric garment generally indicated at G such as a shirt. A composite label generally indicated at 10 is shown to be adhered to the inside of the garment G. Although the embodiment is illustrated to be a composite label 10 for use on a garment G it is capable of being attached to substrates other than garments. The composite label 10 may be attached to the garment G by sewing or stitching 11 as shown, or adhesively, or by heat sealing, or ultrasonically which is a type of heat connection.

The composite label 10 is shown in FIGS. 2 through 4 in different views. At least one and preferably two labels 12 and 13 may be attached to a connector or hanger 14. The labels 12 and 13 and the connector 14 can be comprised of any suitable material such as fabric, either woven or non-woven, polyester being the most preferred material. The connector 14 is shown attached to the garment by the sewing or stitching 11. The labels 12 and 13 are each attached to the connector 14 between ends 15 and 16 of the connector 14. The labels 12 and 13 are most preferably attached to the connector 14 by an ultrasonic connection, but they can be connected to the connector 14 by adhesive, or other suitable means. The ultrasonic connection may be considered to be an ultrasonic weld or weldment. One or both labels 12 and 13 are releasably attached to the connector 14 so that one or both of the labels 12 and 13 can be separated from the connector 14 as by manually pulling on the label 12 and/or 13, without the need to cut the label 12 or 13 from the connector 14 or without the need to cut the connector 14 and/or the labels 12 and/or 13. In that the need to cut the label 12 and/or 13 from the connector 14 or to cut the connector 14 is obviated, therefore, there is no chance that any cutting action will result in cutting the garment G or other substrate. The connector 14 may be rectangular as shown, but it can have other shapes. The connector 14 is preferably attached to the garment G at a marginal area 17 adjacent edge 15 and the remainder of the connector 14 is shown to be unattached and to be a tab. The labels 12 and 13 are illustrated in FIG. 2 to be flared outwardly and downwardly from the connector 14 for clarity of illustration. FIG. 4 is a view of the composite label 10 without showing the garment G. In that FIG. 4 is a view taken from the left side of FIG. 3, the label 12 is shown in elevation with a corner turned up to show the label 13. As is evident from the FIGS. 2 and 4 particularly, both sides of the label can have indicia I, either printed or woven. Usually one label such as a label 13 can comprise indicia such as advertising material, for example, the manufacturer's logo, and the other label 12 can comprise legally required information such as the country of origin, size, composite of the material and the like.

The labels 12 and 13 are shown to be generally rectangular and to be separately releasably adhered to the connector 14 at margins 18 and 19. The margins or end portions 18 and 19 are adjacent label ends 20 and 21. The label ends 20 and 21 are spaced from respective label ends 22 and 23. The connection of the labels 12 and 13 to the connector 14 is preferably strong enough to keep the labels adhered to the connector 14 during repeated washings or dry cleanings, yet the connection is weak enough so that either one or both of the labels 12 or 13 can be manually pulled or stripped away from the connector 14 without destroying the connector 14 or the garment G. The areas of attachment or the attachments or the connections are indicated at 24 and 25. One or both of the connections 24 and 25 are shown by cross-hatching in FIGS. 1, 2 and 4 and by a squiggly line in FIG. 4. The attachments 24 and 25 are at margins 18 and 19 and are adjacent the edges 20 and 21 at end portions 18 and 19 of the labels 12 and 13. The labels 12 and 13 are preferably attached only at one end portion so that the labels 12 and 13 hang naturally as they should and look like and act as tabs. While the attachments 24 and 25, and thus the labels 12 and 13 are shown to be aligned, that is attached at the same places between ends 15 and 16 of the connector 14, they may be offset or staggered by being attached at different places between the ends 15 and 16 of the connector 14. The labels 12 and 13 can have shapes other than rectangular, if desired.

It is preferred that the connector 14 and the labels 12 and 13 be comprised of a material which is unreceptive to colored dyes. One such material is polyester, but other materials such as nylon can be used.

One use of the composite label 10 is as follows: The composite label 10 is sold to a garment manufacturer where the composite label 10 is sewn or otherwise adhered to a garment as, for example, by sewing the connector 14 as shown at 11. The garment manufacturer may or may not dye the garment. Because preferably both the labels 12 and 13 and the connector 14 are comprised of a material which is unreceptive to the dye, the garment which is receptive to the dye is dyed but the composite label 11 is not dyed. The dyed or undyed garment can be sold to a wholesaler, distributor or other intermediary that removes one or both of the labels and adheres its own label or labels to the connector 14. FIG. 5 shows a fragment of the garment G and the connector 14 from which the labels 12 and 13 have been removed. Because the labels 12 and 13 have been connected to the connector 14, a mark or telltale indication may be left on the connector 14 as indicated at 26. FIG. 6 shows new or different labels 27 and 28 attached by sewing or stitching 29, but any other suitable means of attachment such as adhesive or heat sealing including ultrasonically connecting or sealing can be used. The composite label 10 can be dyed either before or after the new labels 27 and/or 28 have been attached to the connector 14, but dyeing before attachment of the new labels 27 and/or 28 to the connector 14 is preferred. In the case of dyeing after the attachment of the new labels 27 and/or 28, the material of which the labels 27 and 28 is constructed should preferably be unreceptive to the dye. The manner of attachment of the labels 27 and 28 is such that the attachment to the connector 14 is permanent, that is, not only should the thus modified composite label be preferably able to endure repeated washings or dry cleanings, but the attachment of the labels to the connector 14 is preferably such that the labels 27 and 28 are not removable except by cutting them apart from the connector 14. The labels 27 and 28 can be of any suitable material such as fabric, plastics or the like. Both sides of each label 27 and 28 can bear indicia I'.

The wholesaler may desire to leave the label 13 with the legally required information attached to the connector 14 and to just remove the label 13 with the manufacturer's information and replace label 13 with the wholesaler's own label. The wholesaler's label may be sewn or otherwise suitably attached permanently enough to endure repeated washings or dry cleanings and so that it cannot be removed except by cutting.

Figure 9:
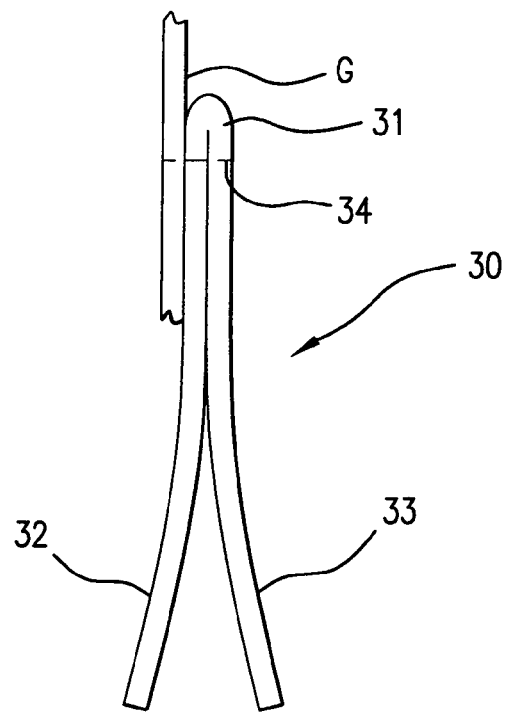
FIG. 9 is a side elevational view of the composite label and a fragment of a garment as seen from the left side of FIG. 8.

FIGS. 8 and 9 show a prior art type of label known as a "booklet label" and indicated by reference character 30. The label 30 is formed into a loop at a fold 31 having two panels or label portions 32 and 33, each of which can carry indicia I'' on both sides thereof. The composite label 30 can be attached to the garment, as by sewing or stitching 34. The composite label 30 has been comprised of any suitable material such as acetate, polyester or the like.

Other embodiments and modifications will suggest themselves to those skilled in the art, and all such of these as come within the spirit of this invention are included within its scope as best defined by the appended claims.

I claim:

1. A composite label, comprising:
   at least one fabric label capable of enduring repeated washings, the label containing information, and
   a connector composed of fabric and capable of being connected to a garment, each label being removably connected to the connector by a heat seal which is weak enough so that the label(s) can be manually detached from the connector.

2. The composite label defined in claim 1, wherein there are two labels.

3. The composite label defined in claim 1, wherein there is one label connected to one side of the connector and another label connected to the other side of the connector.

4. The composite label as defined in claim 1, wherein the at least one label is comprised of a fabric which is essentially unreceptive to colored dyes.

5. A composite label as defined in claim 1, including a garment to which the connector is connected.

6. A composite label as defined in claim 1, including a garment to which the connector is connected and wherein the at least one label is comprised of a fabric which is unreceptive to colored dyes.

* * * * *